(12) United States Patent
Zarella et al.

(10) Patent No.: US 10,185,326 B2
(45) Date of Patent: Jan. 22, 2019

(54) VEHICLE OPERATION CONTROL SYSTEM

(71) Applicant: GENERAL ELECTRIC COMPANY, Schenectady, NY (US)

(72) Inventors: Scott Joseph Zarella, Erie, PA (US); Ikechi Emelogu, Erie, PA (US); Brian Edward Celidonia, Erie, PA (US); Narendrasingh Puransingh Patnurkar, Bangalore (IN); Kaushik Sondur, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/198,102

(22) Filed: Jun. 30, 2016

(65) Prior Publication Data

US 2018/0004228 A1 Jan. 4, 2018

(51) Int. Cl.
*G01C 21/36* (2006.01)
*G05D 1/00* (2006.01)
*G05D 1/02* (2006.01)
*G05D 1/03* (2006.01)

(52) U.S. Cl.
CPC ......... *G05D 1/0287* (2013.01); *G05D 1/0022* (2013.01); *G05D 1/0027* (2013.01); *G05D 1/0276* (2013.01)

(58) Field of Classification Search
None
See application file for complete search history.

(56) References Cited

U.S. PATENT DOCUMENTS

| | | | |
|---|---|---|---|
| 4,774,669 A | 9/1988 | Schmitz et al. | |
| 5,142,277 A | 8/1992 | Yarberry et al. | |
| 5,172,316 A | 12/1992 | Root et al. | |
| 5,293,632 A | 3/1994 | Novakovich et al. | |
| 5,673,876 A | 10/1997 | Lumbis et al. | |
| 5,907,193 A | 5/1999 | Lumbis | |
| 6,229,452 B1 | 5/2001 | Kull | |
| 6,401,015 B1 | 6/2002 | Stewart et al. | |
| 6,980,127 B2 | 12/2005 | Lumbis et al. | |
| 7,073,753 B2 | 7/2006 | Root et al. | |
| 9,233,696 B2 | 1/2016 | Kumar et al. | |
| 2006/0085103 A1* | 4/2006 | Smith, Jr. | B61L 15/0027 701/19 |
| 2006/0231302 A1* | 10/2006 | Rose | B62B 3/0612 180/19.3 |
| 2007/0137904 A1* | 6/2007 | Rose | B62B 3/0612 180/19.1 |
| 2008/0147256 A1* | 6/2008 | Liberatore | F02D 29/06 701/19 |
| 2010/0145559 A1* | 6/2010 | Gauthier | B60K 6/365 701/22 |

(Continued)

FOREIGN PATENT DOCUMENTS

CA 2420445 C 12/2009

*Primary Examiner* — Rami Khatib
(74) *Attorney, Agent, or Firm* — Christopher R. Carroll; The Small Patent Law Group LLC

(57) ABSTRACT

A vehicle control system includes an operation manager controller electrically coupled to an operator controller of a vehicle and to a local vehicle control system of the vehicle. The operation manager controller receives an operator command from the operator controller and can regulate the operator command to control operation of the vehicle.

13 Claims, 4 Drawing Sheets

(56) References Cited

U.S. PATENT DOCUMENTS

| | | | | |
|---|---|---|---|---|
| 2010/0164703 A1* | 7/2010 | Visconti | ................ | B60W 40/09 340/438 |
| 2015/0346724 A1* | 12/2015 | Jones | .................... | B60W 30/12 701/23 |
| 2017/0349167 A1* | 12/2017 | Fahland | ................ | B60W 10/12 |

* cited by examiner

VEHICLE OPERATION CONTROL SYSTEM

FIELD

Embodiments of the invention relate to control of vehicle operations in response to detected vehicle operating conditions.

BACKGROUND

When controlling a vehicle an operator may have to comply with prescribed operating requirements. These operating requirements may include both speed limits, route selections, and time constraints for reaching a desired destination. Furthermore, the operator may consider fuel consumption, wheel wear, track or road wear, weather, traffic conditions, and other vehicle operating parameters when operating the vehicle during a trip.

It may be desirable to have a vehicle control system or method that differs from those that are currently available.

BRIEF DESCRIPTION

In an embodiment, a control system (e.g., operation management system) for a vehicle includes an operator management (OM) controller that has a first interface coupled to an operator controller of the vehicle, and a second interface electrically coupled to a local vehicle control system of the vehicle. The OM controller is logically interposed between the operator controller and the local vehicle control system, and is configured to receive an operator command via the first interface from the operator controller and receive signals of external conditions relating to operation of the vehicle from one or more sensors, evaluate the received operator command to a plurality of trigger conditions and one or more sensed external conditions, modify the operator command to generate a modified operator command that is different from the operator command that is received via the first interface if one or more trigger conditions are met, and send the modified operator command via the second interface to the local vehicle control system to control operation of the vehicle based on the modified operator command.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
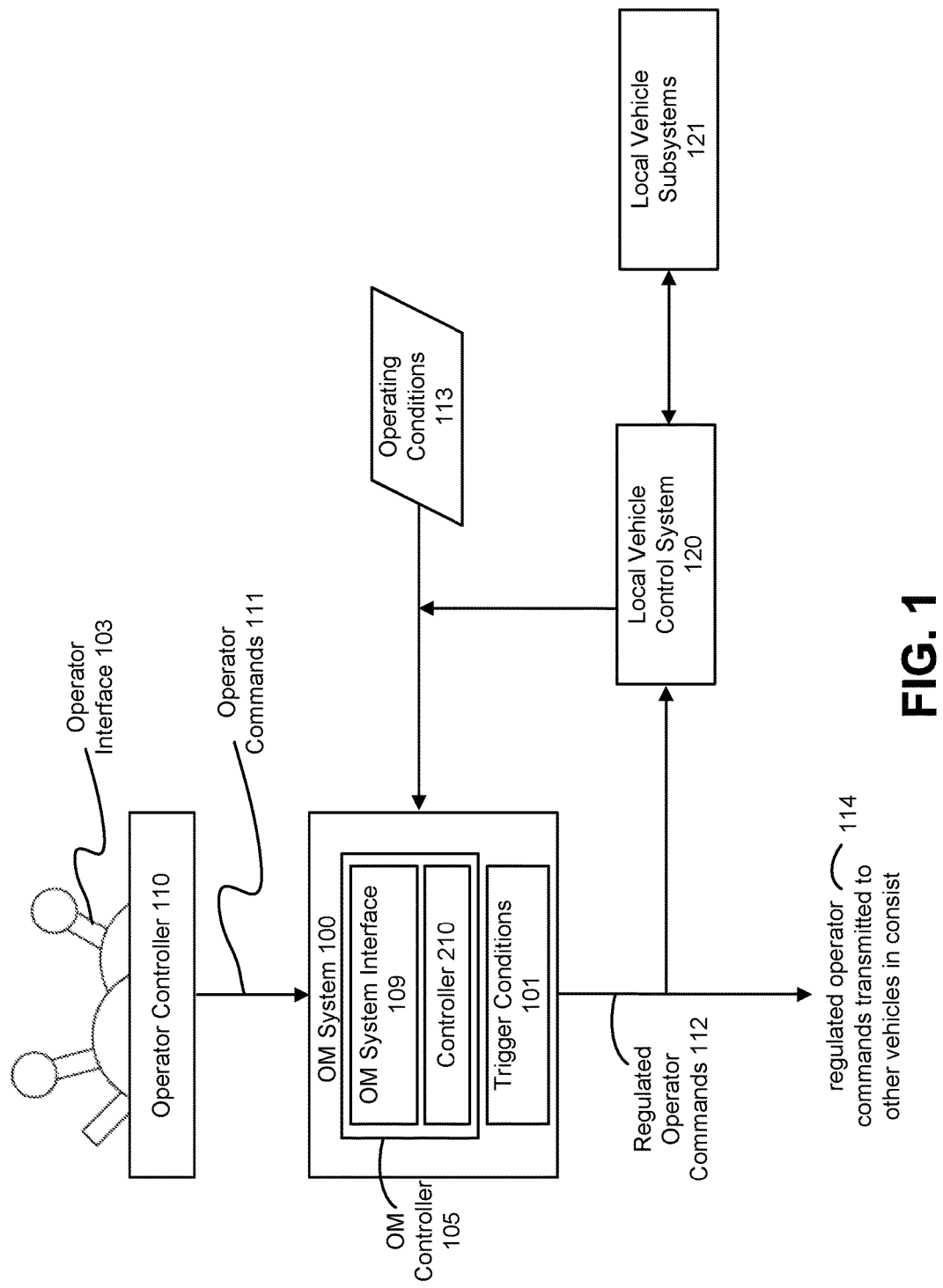
FIG. 1 illustrates an operation manager system, according to an example of the present disclosure.

In one aspect, a vehicle control system (e.g., operation management (OM) system) may provide intelligent control over a vehicle in response to manual vehicle control operations and detected operating conditions associated with the vehicle. The OM system may control braking (e.g., dynamic braking, application of friction brakes), motoring (e.g., vehicle speed, engine speed), direction (e.g., left/right, up/down, forward/reverse) and other operations of a vehicle based on manual vehicle control operations. For example, the OM system may be electronically coupled to an operator controller of the vehicle to receive operator commands, such as for braking, motoring, and direction control. The OM system is capable of regulating the operator commands based on trigger conditions and modified vehicle operations programmed in the OM system. Regulating the operator commands may include modifying the operator commands, for example, to correct for undesired or invalid operator commands. Also, by way of example, the OM system may regulate the operator commands by determining operating conditions, and using this information to identify acceptable ramp rates, limits, and gains for the desired vehicle operation, such as limits or rates for increasing or decreasing vehicle speed, engine speed (e.g., throttle or notch), or dynamic braking.

In one embodiment, the vehicle controlled by the OM system may be a locomotive that is part of a train, and that train may include one or more additional locomotives to form one or more corresponding consists. If the vehicle controlled by the OM system is part of a consist, the OM system can provide control over the entire consist. The consist for example includes multiple directly-linked vehicles to provide motoring and/or braking capability with no vehicles interposed there-between. For example, the consist may include multiple directly-linked locomotives to provide motoring and/or braking capability with no railcars interposed between the locomotives.

There may be a lead consist and one or more remote consists. For example, a first remote consist is midway along a line of railcars, and another remote consist is at an end of the train. Each consist may have a controlling or lead locomotive and one or more following/slave locomotives. Though the first locomotive may viewed as a controlling or lead locomotive, the first locomotive in a multi-locomotive consist may be physically located in a directionally trailing position. Also, even though a consist is usually considered as successively connected locomotives, a group of locomotives may also be recognized as a consist even with at least one railcar separating the locomotives, such as when the consist is performing a distributed power operation, in which motoring and braking commands are relayed from the lead locomotive to the remote trailing vehicles by a radio link or a physical cable.

In an example, the OM system may be installed in a lead vehicle of the consist but can provide control over the entire consist. For example, the OM system may be installed on the lead vehicle, and transmit acceleration, braking and direction commands to the control system of the lead vehicle and other vehicles in the consist via a train line or another communication link connecting the vehicles in the consist.

The OM system provides technical solutions to technical problems. For example, technical problems often associated with vehicle operation are commonly related to faults or failures of mechanical parts and mechanical subsystems of the vehicle. The OM system can regulate operator commands and control the vehicle to minimize wear on mechanical subsystems and thus improve their reliability. For example, the OM system can regulate motoring commands to all the vehicles in a consist. This can minimize mechanical stress and enhance the reliability on engine, traction, and propulsion subsystems which may be caused by high duty cycles and ramp rates on the lead vehicle and other vehicles in the consist. Also, if speed of the vehicle is decreased too quickly, it may cause the train turbocharger to surge, which causes reliability issues. The OM system can provide a ramp down rate for reducing speed that prevents turbocharger surges.

The OM system can correct undesirable vehicle operator actions for motoring, dynamic braking, or direction control sequencing. In existing manual vehicle control designs, the vehicle is controlled by the operator directly through a master controller. The OM system may detect operator commands that can result in unsafe operation of the vehicle or consist, and ignore or modify the operator commands to correct for potentially unsafe situations. In the case of emergencies or unexpected conditions, the OM system may detect these conditions, and in real-time, provide enhanced operator commands to maximize safe operation of the vehicle.

In a non-locomotive example, the vehicle can be one of a plurality of vehicles communicatively coupled together. This communicatively coupled group of vehicles is another type of consist. There may be multiple groups of vehicles, and each group may be a logically coupled group of vehicles in communication while moving. These couplings, whether physical and/or communicative, provide for control of both the individual vehicles, as well as the control over the entire group or consist. This control can include speed, direction, altitude, and positioning relative to each of the other vehicles. Because unmanned or remotely controlled vehicles may move in groups or swarms, this multi-level control may be helpful. As one specific non-locomotive example, passenger cars may move down a highway while communicating with each other and with off-board devices, and may speed up, slow down, turn, and/or change lanes (as well as linking and de-linking with the consist) as a group and/or as individual components of the group.

FIG. 1 shows an OM system 100 according to an example of the present disclosure. The OM system is also referred to as a vehicle operation manager system, and may control operation of one or more vehicles, which may be included in one or more consists.

The OM system may include an OM controller 105 including an OM system interface 109, and a controller 210, to receive operator commands 111 and regulate the operator commands 111. An operator of the vehicle may manually control an operator interface 103 to control braking, acceleration and direction of the vehicle. In response to the manual control of the operator interface, an operator controller 110 generates signals to control the braking, speed and direction of the vehicle or other operations according to the manual control of the operator interface. The operator controller may be referred to as a master controller. The various system components may be coupled together through either direct electrical connections or through a network communication interface. The OM system may exist on the hardware forming the operator controller, as standalone hardware or software entity, or may be remotely located from the operator controller and/or the vehicle controller.

According to an example, a manual operator interface of the operator controller may include a throttle lever that can be moved to increase or decrease the engine speed and/or the ground speed of the vehicle. Similarly, a brake lever may be provided to apply dynamic or friction braking to slow the vehicle. Depending on how the operator moves the controls, the operator controller generates signals to cause the vehicle to change its operations. For example, if a throttle lever is moved from a first position to a second position, then a signal is generated to increase the speed of the vehicle to a second predetermined speed. Similarly, braking and direction control signals may be generated by the operator controller. These signals carry operator commands, which include commands to control the vehicle based on the operation of the operator interface. Autonomous systems may generate input to the operator interface as a transfer function or output based on an array of external directed sensors.

According to an example of the present disclosure, instead of sending the operator commands directly to a local vehicle control system 120 of the vehicle, the OM system is electrically coupled or interposed between the operator controller and the local vehicle control system to regulate the operator commands sent to the local vehicle control system. The OM system receives the operator commands and may send modified operator commands 112 to the local vehicle control system. A modified operator command of the modified operator commands for example is an operator command determined in response to the operator command from the operator controller. The modified operator commands may be different from the operator commands. For example, the modified operator commands may cause the local vehicle control system to control the vehicle differently than the operator commands. For example, if the operator commands would cause a speed increase or decrease at a rate that exceeds a threshold, then the modified operator commands may be generated that may include motoring or braking commands to increase or decrease the speed at a predetermined rate.

The OM system may determine the modified operator commands based on operating conditions 113 associated with the vehicle. For example, the operator commands include a motoring increase but the operating conditions indicate there is one or more of: a fault in the motoring subsystem; a signal from sensors detecting unsafe weather conditions, a location of the vehicle indicates travel on a steep grade, a manifest indicates a full/heavy load is being hauled (or conversely, the vehicle is underweight and empty), the wheel age indicates that the wheel tread is worn, the route surface has reduced friction coefficient (e.g., ice, oil, leaves), and the like. Based on the operating conditions, the OM system may generate modified operator commands that limit the maximum speed of the vehicle, or may apply a cap to the amount of braking force applied, or prevent steering beyond a determined radius of curvature, and the like. In another example, the operating conditions may indicate whether the vehicle is moving at all, and the speed at which the vehicle is moving. An operator command to change the direction (e.g., forward or reverse) of the vehicle when the vehicle is moving above a predetermined speed may be modified to first stop the vehicle and then implement the direction command. A forward moving vehicle is not thrown into reverse, or a vehicle rolling backwards down a hill during startup has torque applied for forward movement but at a lower gear setting or with a slower speed ramp that it otherwise might have applied.

Examples of additional operating conditions may include environmental conditions, local subsystem states (e.g., whether there are any deficiencies, faults or failures in the subsystems of the vehicle), consist state (e.g., whether there are any deficiencies, faults or failures in other vehicles of a consist), operating state (e.g., whether the brakes are applied, whether the vehicle or consist is in motion, etc.), vehicle control statuses (e.g., whether the vehicle is setting up for braking or setting up for another operation, or diagnostics of subsystems), weight of the train, etc. One or more of the operating conditions may be received from sensors or other circuits or subsystems. The operating conditions may include information provided from the local vehicle control system, such as the current operating state of local vehicle subsystems 121. One or more sensors may communicate with the OM controller information relating to one or more of environmental or ambient conditions proximate to the vehicle, local equipment state or condition, transportation network state or condition, and operating state or condition of the vehicle. The environmental or ambient conditions proximate to the vehicle may include weather or seasonal aspects. The weather may include temperature, pressure, humidity, precipitation, and ozone or pollution. The seasonal aspects may include a presence or likelihood of the presence of snow, ice, leaves, insects, mud, sand, and airborne dust.

In some instances, the OM system may ignore the operator commands, and may not send any operator commands to the local vehicle control system. For example, if the operator command is to increase to a higher motoring speed but the operating conditions indicate there is a fault in the motoring subsystem or if sensors detect unsafe weather conditions, the operator command to increase to a higher motoring speed may be ignored and the vehicle may be maintained at its current speed. In other instances, the operator commands may be modified, such as to control the rate of increase or decrease of speed of the vehicle. In other instances, the OM system may send the operator commands to the local vehicle control system without modifications, such as when modifications are unwarranted or are consistent with safe or desired vehicle operation.

The OM system may store trigger conditions 101 that are designed to detect when the operator commands should be regulated. A trigger condition for example may include a detectable event and/or an operating condition of the operating conditions of the vehicle. If a trigger condition is detected, then the OM system may regulate an operator command. Examples of the trigger conditions 101 are discussed above and throughout the present disclosure, such as throttle rate increases or decreases that exceed a threshold, excessive braking that exceed a threshold, operating conditions or various combinations of the operating conditions and the operator commands that would cause an unsafe condition or that may cause preventable wear on local vehicle subsystems 121 or inefficient operation of the vehicle.

The local vehicle control system may control local vehicle subsystems according to the modified operator commands. The local vehicle subsystems may include braking systems, propulsion systems, and the like. The modified operator commands may be sent to the corresponding local subsystem by the local vehicle control system to control the operation of the vehicle.

Shown as labeled 114, the OM system may send operator commands, including the modified operator commands, to other vehicles in a consist if the vehicle is part of a consist. For example, the OM system may send modified operator commands for braking, throttle control or direction control to other vehicles in the consist to execute desired vehicle operations, which is further described below.

Figure 2:
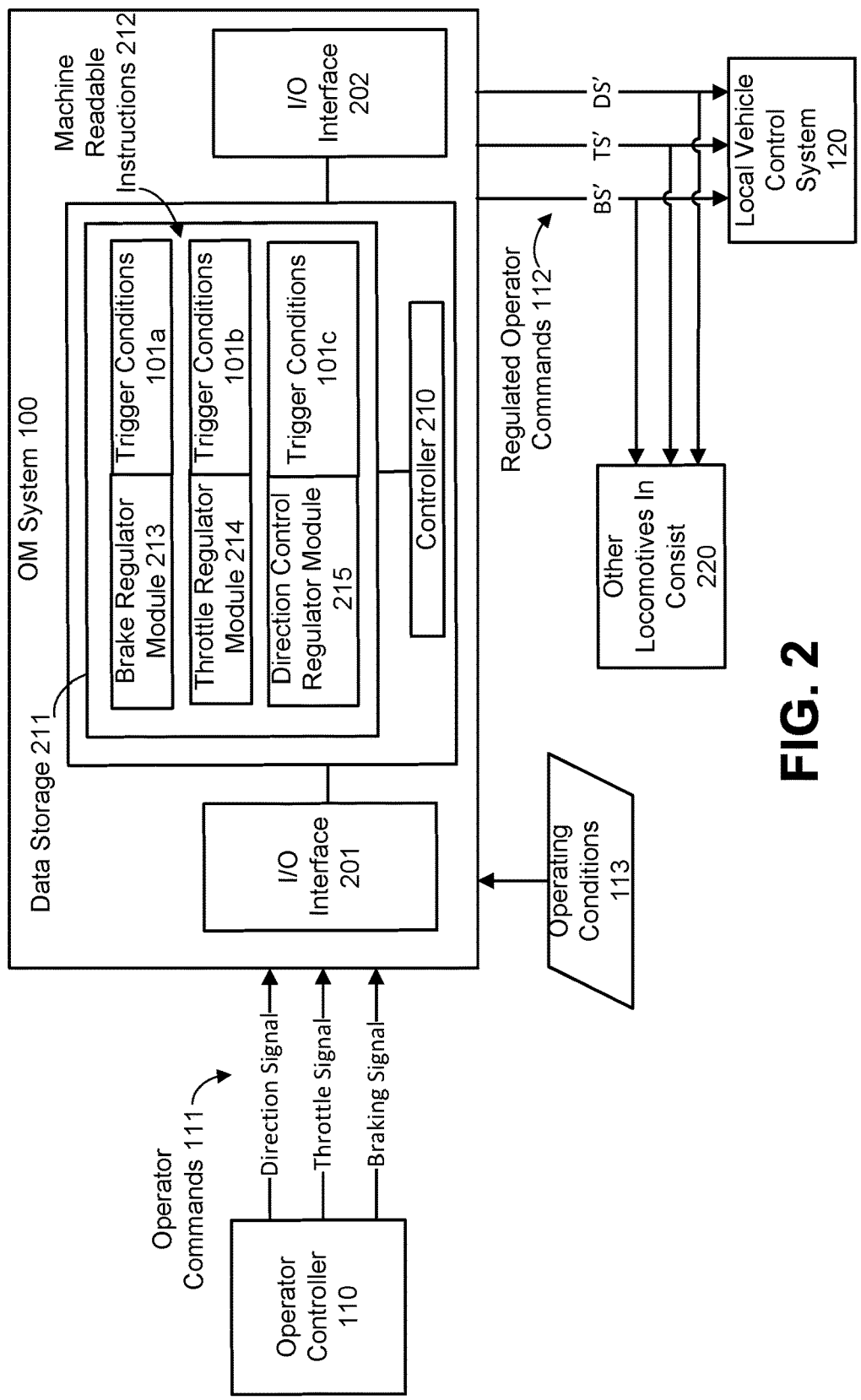
FIG. 2 illustrates components that may be included in the operation manager system depicted in FIG. 1, according to an example of the present disclosure.

FIG. 2 shows an example of components of the OM system. The OM system may include the controller 210. The controller, for example, is an integrated circuit that can execute machine readable instructions 212 that may be stored in data storage 211. The controller may include a processor or another type of processing circuit. For example, the controller may include Field Programmable Gate Arrays (FPGAs) or an Application Specific Integrated Circuit (ASIC) or other customized processing circuit. The data storage may include a non-transitory computer readable medium storing the machine readable instructions 212 that are executable by the controller to perform the methods, processes, functions, etc. of the OM system described herein. By way of example, the data storage may include hardware storage devices, such as RAM (random access memory), ROM (read only memory), EPROM (erasable, programmable ROM), EEPROM (electrically erasable, programmable ROM), flash memory, etc. In an example, the trigger conditions 101 may be embodied in machine readable instructions. For example, the trigger conditions 101 may be included in the machine readable instructions stored in the data storage. The machine readable instructions may be changed by re-programming.

The OM system may include one or more Input/Output (I/O) interfaces, such as I/O interface 201 and I/O interface 202. The OM system interface 109 shown in FIG. 1 may include one or more of the I/O interface 201 and I/O interface 202. For example, the I/O interface 201 receives signals from the operator controller. The signals may include the operator commands, and examples of the signals may include a direction signal, a throttle signal, and a braking signal. If any of the signals are analog, those signals may be converted to digital signals through an analog-to-digital converter.

The operator controller may be a master controller that has hard-wired, direct electrical connection to throttle, braking and direction train lines, which may include wires carrying throttle, braking and direction commands. The I/O interface 201 may be connected to the wires connected to the master controller to receive the direction, throttle and braking signals from the master controller.

The I/O interface 202 may output signals carrying the modified operator commands, which may be different from the operator commands. Examples of the signals output from the I/O interface 202 are shown as BS', TS', and DS', e.g., carrying modified operator commands for braking, throttle, and direction control. The I/O interfaces 201 may include I/O pins for an integrated circuit or other types of I/O interface hardware. Also, the I/O interfaces 201-202 are shown as separate interfaces by way of example, and may be provided as a single I/O interface. The OM system may include any suitable I/O interface that allows the OM system to communicate with other systems inside and outside the vehicle.

The signals output from the I/O interface 202, shown as BS', TS', and DS', carrying the modified operator commands, may be sent to the local vehicle control system of the vehicle to control operation of the vehicle. Furthermore, BS', TS', and DS' may include signals transmitted to other vehicles in a consist, shown as 220, if the vehicle is part of a consist.

In an example, BS', TS', and DS' are train line signals transmitted on a train line. The train line is an electrical pathway that carries these signals. The train line may be comprised of a bundle of wires, each of which may be connected in an electrically continuous path over the length of the train. The train line can provide a hard-wired connection between vehicles in a consist, which may be referred to as a multiple unit (MU) consist. One or more of BS', TS', and DS' may be communicated via a wireless link, such as a radio frequency (RF) wireless signal, if wireless transceivers are available.

The train line signals carried by the train line may be standardized. For example, DS' may comprise TL8 (e.g., a forward direction train line signal) or TL9 (e.g., a forward direction train line signal). Similarly, standardized train line signals may be used for TS' (e.g., motoring or throttle signals) and for BS' (e.g., dynamic braking and air brake signals).

In an example, the OM system may include a special purpose computer. For example, the OM system may be designed to perform dedicated functions, and may thus be different than a general purpose computer system that is designed to execute any number of programs or software applications that may perform various unrelated tasks. For example, the dedicated functions performed by the OM system may include the functions, operations and methods described herein for controlling operation of the vehicle and/or the consist. The controller may be a microcontroller to perform the dedicated functions of the OM system. The microcontroller may include a central processing unit and flash memory and/or some other form of non-volatile memory provided on a single chip, which is typically not done for a general purpose microprocessor which may be used in a personal computer to run software applications. Furthermore, the microcontroller may run at a different clock speed than a general purpose microprocessor and may have different power requirements. For example, the microcontroller runs at speeds to allow for real-time vehicle control, including controlling the vehicle in emergency situations that may require immediate braking. The OM system may be an embedded system dedicated to perform the functions of the OM system within a larger mechanical and electrical system of the vehicle. The embedded system may have real-time computing constraints, such as to provide the modified operator commands in real-time to control the operation of the vehicle based on operator input, such as the operator commands and the operating conditions.

As discussed above, the OM system may receive the operator commands and generate the modified operator commands, which may include modifications to the modified operator commands. The modified operator commands may be determined based on the operating conditions. The operating conditions may be received via one or more of the I/O interfaces shown in FIG. 2. The modified operator commands may also be determined based on the trigger conditions 101.

The controller may execute the machine readable instructions to determine the modified operator commands based on the operating conditions and/or the trigger conditions. The machine readable instructions may regulate the operator commands based on programmed functions and the trigger conditions which may also be programmed. The functions and trigger conditions may be provided by a user to enforce desired operation of the vehicle, such as operation that may minimize wear of the vehicle and promote safety. In an example, the machine readable instructions may include a brake regulator module 213, a throttle regulator module 214, and a direction control regulator module 215. Each of the modules may comprise a subset of the machine readable instructions and may regulate braking commands, motoring commands, and direction control commands, respectively. The modules may work in combination, such as when motoring and braking, or braking and direction control, are executed together. Also, the machine readable instructions are not limited to the modules and may include modules to regulate other types of operator commands.

The brake regulator module, for example, determines whether to regulate operator commands for braking. The brake regulator module may include trigger conditions 101a related to braking for the vehicle. According to an example, the OM system receives a braking command from the operator controller. Operating conditions are determined and may include indications of whether the vehicle is moving, the current speed if it is moving, the grade of the route over which it is moving, detected faults, age and health of the components, previous braking performance, and particulars about the vehicle itself (whether it is loaded or unloaded, and the like). The brake regulator module may generate a modified operator command to apply dynamic braking, which uses electric traction motors of the vehicle as generators when slowing, instead of mechanical air brakes in response to detecting trigger conditions, such as receiving an operator command for braking and determining the current speed is over a threshold. In another example, the trigger conditions may include whether friction (e.g., air) brakes are applied or not. If the air brakes are already applied and in operation, then the brake regulator module may generate modified operator commands to apply a blend of dynamic brakes and air brakes. In another example, a service brake may be applied, but only when the vehicle is to come to a complete stop. The trigger conditions 101a may include receiving a command for emergency braking, and the brake regulator module 213 generating a modified operator command to apply all available brakes to stop the vehicle.

In one example, the motoring control is a throttle regulator. The throttle regulator controls an engine's fuel system and engine speed. For propulsion systems where the engine is mechanically coupled to the wheels (e.g., through a gearbox) the faster the engine turns, the faster the vehicle moves. Where the engine is decoupled from the wheels and ground speed, such as in an electric hybrid vehicle or a locomotive, the engine is coupled to a generator or alternator. Thus, the engine can be operated at a plurality of optimized engine speeds (unlike the infinitely variable, mechanically coupled engine). These optimized engine speed modes may be referred to as notches.

The throttle regulator module 214, for example, determines whether to regulate operator commands for throttle control. The throttle regulator module may include functions for calculating throttle rate increases or decreases based on trigger conditions 101b. For example, an operator command may include a throttle command for a throttle notch increase from notch 2 to notch 6. The OM system determines the operating conditions. For example, the OM system determines whether trigger conditions exist, such as an applied parking brake or a detected fault. If these trigger conditions are detected, then the throttle regulator module generates modified operator commands to remove the parking brake and ramp up the speed at a predetermined or calculated rate until the speed for throttle level 6 is reached. In another example, if a fault is detected that is related to motoring, then a modified operator command is generated to ramp up the speed at a slower rate until the speed for throttle level 6 is reached. In another example, the throttle regulator module receives a throttle command from the operator controller to decrease speed from throttle level 6 to throttle level 2, and a trigger condition is met regarding a throttle decrease greater than 2 throttle levels. In this example, the throttle regulator module may generate modified operator commands to ramp down the speed at a particular rate.

Direction control for the vehicle may include controlling the vehicle to move in a forward direction or a reverse direction. The direction control regulator module, for example, determines whether to regulate operator commands for controlling the direction of the vehicle. A vehicle may not be able to change direction quickly, and instead, may require a relatively long period of time before the vehicle can slow down and stop and change directions. An instantaneous change in direction may damage motor and propulsion systems. The direction control regulator module can regulate when an operator command for direction control is executed. For example, an operator command is received to command a quick transition from forward to reverse. Trigger conditions 101c may include detecting when the vehicle is moving in a direction opposite to the desired direction and the current speed. The direction control regulator module may generate modified operator commands to slow the vehicle down to a predetermined speed before a direction control change is commanded.

Figure 3:
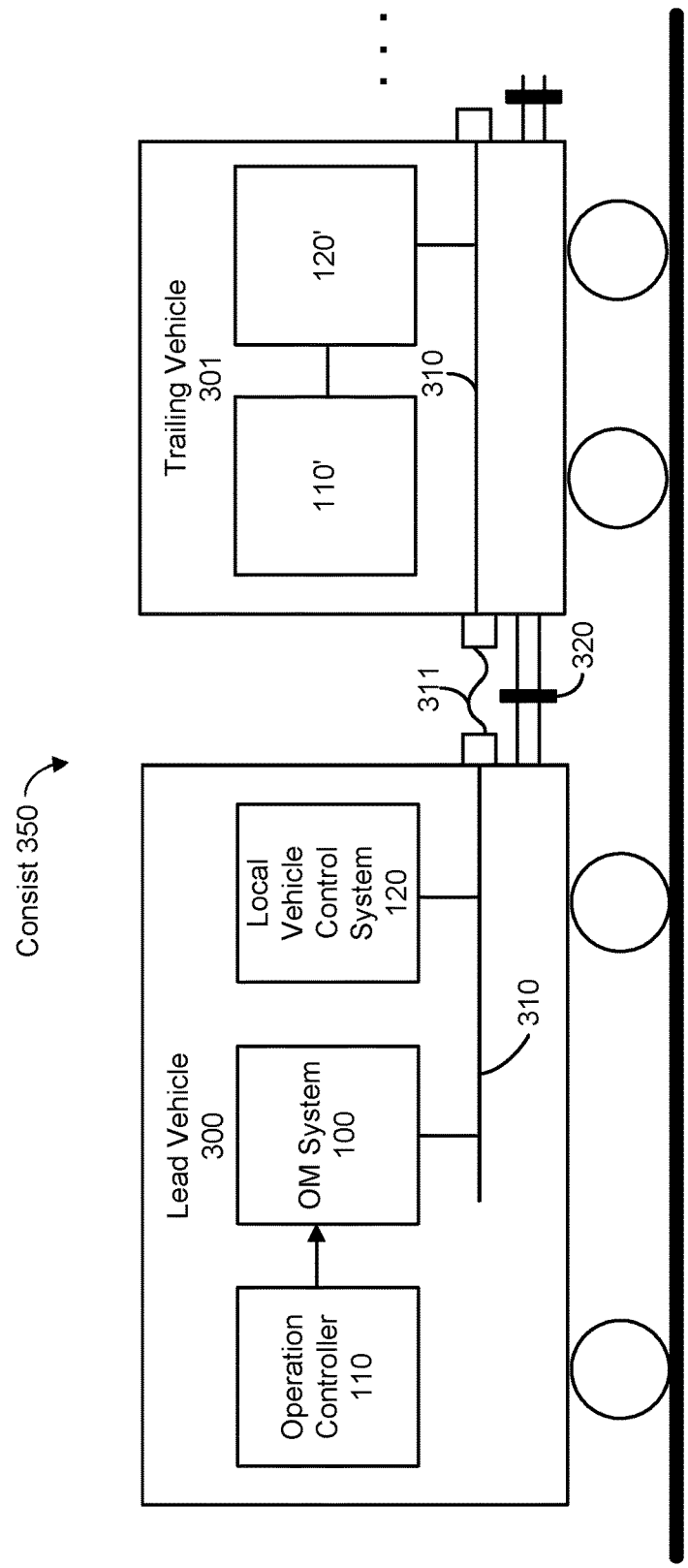
FIG. 3 illustrates a consist, which may include the operation manager system depicted in FIG. 1, according to an example of the present disclosure.

FIG. 3 shows an example of the OM system used in a consist 350. For example, the OM system is installed in the lead vehicle 300 of the consist 350 and is electrically coupled to the operator controller and the local vehicle control system. Electrical coupling may include the transfer of electrical energy from one circuit to another. The transfer is over a communication medium, which may be wired or wireless. The electrical coupling may include sending and/or receiving signals between circuits over a wired or wireless communication medium.

The OM system is electrically coupled to systems in other vehicles in the consist 350. For example, trailing vehicle 301 is shown and is electrically coupled to the lead vehicle 300 via communication link 310. The trailing vehicle may receive modified operator commands, such as signals BS', TS', and DS' shown in FIG. 2. Referring back to FIG. 3, the trailing vehicle may be mechanically coupled to the lead vehicle via mechanical coupler 320. For example, locomotives in a consist may be mechanically coupled. Also, the communication link may be a train line if the consist includes locomotives. Reference numeral 311 represents a jumper between the lead vehicle and the trailing vehicle and may carry the electrical signals of the communication links between vehicles. The jumper may be part of the train line. The OM system may send the modified operator commands via the communication link (e.g., the train line) to local vehicle control system 120' of the trailing vehicle to control operation of the trailing vehicle. The trailing vehicle may include an operator controller 110' but the local vehicle control system 120' may be commanded to implement the modified operator commands received from the OM system instead of operator commands received from the operator controller. The consist may include more than one trailing vehicle which are electrically coupled by the communication link.

In an example, the consist may include different types of vehicles that have different operating limits. Operating limits may be limits on braking, speed, or other operations. In an example, an older type vehicle is mixed with a newer type vehicle in the consist. Operation may involve using the newer type vehicle, e.g., lead vehicle, to drive the older type vehicle, e.g., trailing vehicle. However, the older type vehicle may have operating limits that are different than the newer type vehicle. For example, the newer type vehicle may brake faster or have faster acceleration. The OM system may be programmed to control operation of the newer type vehicle to operate within the operating limited of the older type vehicle to minimize susceptibility of damaging the older type vehicle.

Figure 4:
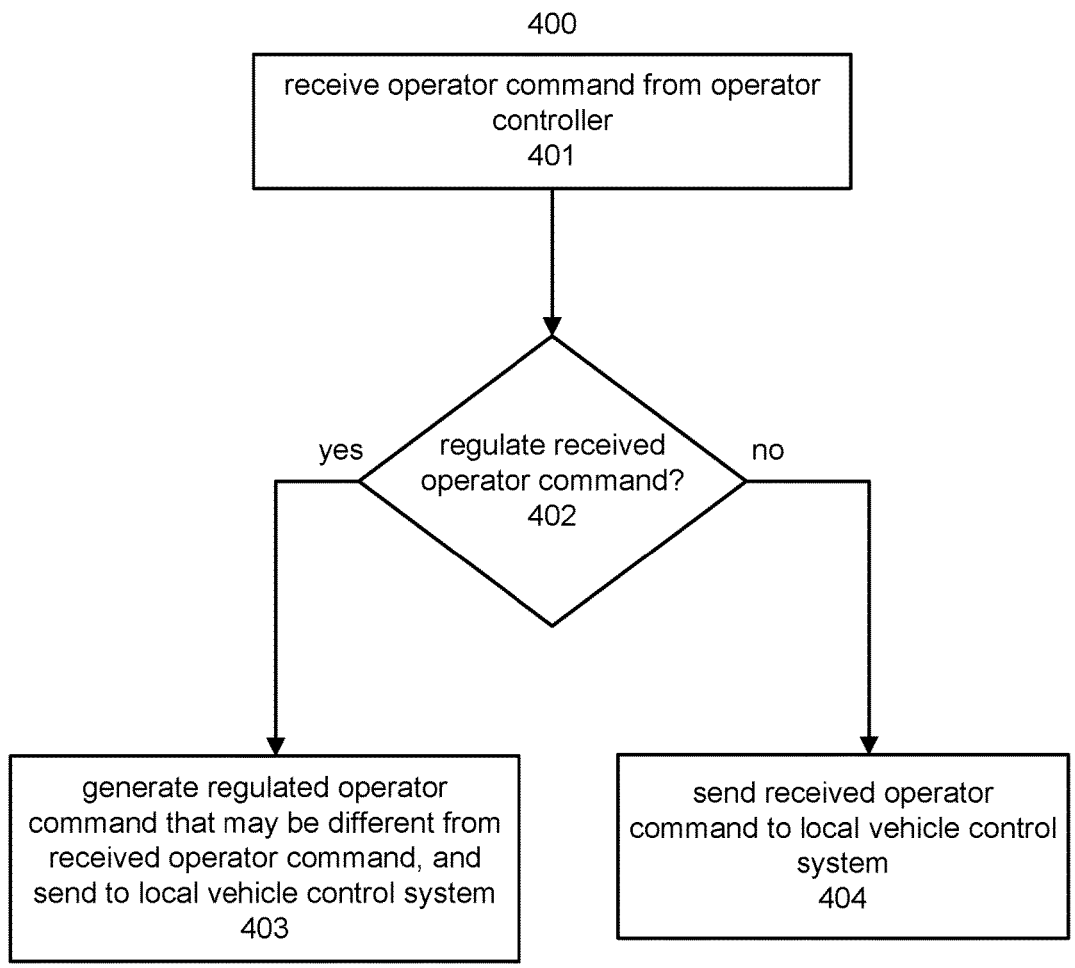
FIG. 4 illustrates a method of controlling operation of a vehicle, according to an example of the present disclosure.

FIG. 4 is a schematic diagram that shows a method 400 for controlling operation of a vehicle, according to an example of the present disclosure. The method may be performed by the OM system disclosed herein. Also, in an example, the method may be performed by the controller executing the machine readable instructions stored in a non-transitory computer readable medium, such as the data storage.

At step 401, the OM system receives an operator command from the operator controller. For example, the operator command may include a throttle command, a braking command, and/or a direction control command. The operator command may be one of the operator commands generated by the operator controller in response to an operator interacting with the operator interface, which may be digital (e.g., touch screen) or analog (e.g., levers, switches, etc.), to control operation of the vehicle.

At step 402, the OM system determines whether to regulate the received operator command. For example, the received operator command is evaluated to (e.g., compared to) the trigger conditions and one or more sensed external conditions, which may include the operating conditions. Based on the evaluation, the received operator command may be regulated. Evaluating may include determining whether one or more of the trigger conditions are met (e.g., satisfied). Also, a status of a trigger condition may be determined by determining whether the trigger condition is satisfied. The received operator command may be regulated if the trigger condition is satisfied. To regulate the operator command may include changing or modifying the operator command. In one example, the operator command may be changed or modified by generating a new operator command based on the received operator command and other factors which may include one or more of the operating conditions and one or more of the trigger conditions. Examples of regulating operator commands is described above with respect to the modules 213-215 shown in FIG. 2. Other examples of regulating operator commands are also described herein.

At step 403, in response to determining to regulate the operator command, the OM system generates a modified operator command that may be different from the operator command received at step 401. For example, the operator command is regulated in response to determining a trigger condition is met. For example, the received operator command is to increase speed from throttle level 2 to throttle level 5. The OM system determines that the rate of speed increase exceeds a threshold, so the OM system generates a modified operator command to increase speed to throttle level 5 gradually. For example, the OM system generates a modified operator command to increase speed to throttle level 3. After a predetermined period of time, the OM system generates a modified operator command to increase speed to throttle level 4. Accordingly, the speed is increased at the rate determined by the OM system.

In another example, the received operator command is a braking command. The OM system determines a rate or limit of increasing or decreasing braking of the vehicle based on the received braking command, an operating condition and a trigger condition. The OM system generates a regulated braking command based on the determined rate or limit.

In another example, the received operator command is a direction control command, and in response to receiving the direction control command, the OM controller generates one or more regulated direction control commands, which may include a braking command and a direction control command.

At step 404, in response to determining not to regulate the operator command received at step 401, the OM system may send the operator command received step at step 401 to the local vehicle control system to control operation of the vehicle based on the received operator command. For example, if none of the trigger conditions step 101 are met, then the OM system may determine that the received operator command does not need to be modified or otherwise regulated. Then, the OM system may send the received operator command to the local vehicle control system to be executed.

The trigger conditions may trigger modifications to an operator command received from the operator controller. Examples of modifying braking commands, throttle commands, and direction commands based on trigger conditions are discussed herein. Other operations may also be modified by the OM system. Trigger conditions to trigger modifications may be based on a variety of factor which may be designed to detect certain conditions, such as operator fatigue, emergency situations, operating conditions that may cause unnecessary wear on the vehicle or consist, and the like.

The disclosure is described with reference to examples. In the description, details are set forth to provide an understanding of the disclosure. Throughout the disclosure, the terms "a" and "an" are intended to denote at least one of a particular element. As used herein, the term "includes" means includes but not limited to, the term "including" means including but not limited to. The term "based on" means based at least in part on. Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. Furthermore, references to "an embodiment" or "one embodiment" of the inventive subject matter are not intended to be interpreted as excluding the existence of additional embodiments that also incorporate the recited features.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What has been described and illustrated herein is an example along with some of its variations. The terms, descriptions and figures used herein are set forth by way of illustration only and are not meant as limitations. Many variations are possible within the scope of the subject matter, which is defined by the following claims and their equivalents.

What is claimed is:

1. A control system for a vehicle consist, comprising:
an operator management (OM) controller comprising:
a first interface electrically coupled to an operator controller of a first vehicle of the vehicle consist, the consist comprising the first vehicle and a second vehicle that is a different type of vehicle than the first vehicle, the second vehicle logically or mechanically coupled with the first vehicle; and
a second interface electrically coupled to a local vehicle control system of the first vehicle;
wherein the OM controller is logically interposed between the operator controller and the local vehicle control system and is configured to:
receive an operator command via the first interface from the operator controller and receive signals of one or more external conditions relating to operation of the first vehicle from one or more sensors;
evaluate the received operator command to one or more trigger conditions and one or more sensed external conditions and operating limits of the second vehicle;
modify the operator command to generate a modified operator command that is different from the operator command that is received via the first interface responsive to the one or more trigger conditions being met, and
send the modified operator command via the second interface to the local vehicle control system to control operation of the first vehicle based on the modified operator command and via a communication link to the second vehicle to control operation of the second vehicle based on the modified operator command, wherein the OM controller is configured to generate the modified operator command based on the operating limits of the second vehicle so that both the first vehicle and the second vehicle are controlled to operate within the operating limits of the second vehicle.

2. The system of claim 1, wherein, if the operator command does not meet at least one of the one or more trigger conditions, the OM controller is further configured to send the operator command that is received via the first interface to the local vehicle control system via the second interface to control operation of the first vehicle based on the operator command received via the first interface.

3. The system of claim 1, wherein the operator command comprises at least one of a throttle command, a braking command, or a direction control command.

4. The system of claim 1, wherein the operator command comprises a braking command, and in response to receiving the braking command, the OM controller is configured to:
determine a rate or limit of increasing or decreasing braking of the first vehicle based on the braking command, the external conditions, and at least one of the one or more trigger conditions associated with the braking command; and
generate at least one regulated braking command to send to the local vehicle control system to control braking of the first vehicle based on the determined rate or limit.

5. The system of claim 1, wherein the operator command comprises a throttle command, and in response to receiving the throttle command, the OM controller is configured to:
determine a limit or rate of increasing or decreasing speed of the first vehicle based on the throttle command, the external conditions, and at least one of the one or more trigger conditions associated with the throttle command; and
generate at least one regulated throttle command to send to the local vehicle control system to control speed of the first vehicle based on the determined rate or limit.

6. The system of claim 1, wherein the operator command comprises a direction control command, and in response to receiving the direction control command, the OM controller is configured to:
generate at least one regulated direction control command based on the direction control command, the external conditions, and at least one of the one or more trigger conditions associated with the direction control command; and
send the regulated direction control commend to the local vehicle control system to control direction of the first vehicle.

7. The system of claim 1, wherein the one or more sensors communicate with the OM controller information relating to one or more of environmental or ambient conditions proximate to the first vehicle, local equipment state or condition, transportation network state or condition, or operating state or condition of the first vehicle.

8. The system of claim 7, wherein the environmental or ambient conditions proximate to the first vehicle comprise weather or seasonal aspects, wherein
the weather comprises temperature, pressure, humidity, precipitation, and ozone or pollution, and
the seasonal aspects comprise a presence or likelihood of the presence of: snow, ice, leaves, insects, mud, sand, and airborne dust.

9. The system of claim 7, wherein the local equipment state or condition comprises an age of the equipment, a maintenance level of the equipment, and a type of the equipment.

10. The system of claim 7, wherein the transportation network state or condition comprises one or more of:
a loading value representing a plurality of vehicles in given area or along a determined section of a route over which the vehicle consist is to travel,
an average speed of the plurality of vehicles in the given area or along the determined section of the route over which the vehicle consist is to travel,
a capacity of the route to accommodate a number of vehicles in the given area or along the determined section of the route over which the vehicle consist is to travel,
a density of vehicles in the given area or along the determined section of the route over which the vehicle consist is to travel,
a location or direction or speed of one or more other vehicles in the given area or along the determined section of the route over which the vehicle consist is to travel, or
a status of one or more traffic control systems that are disposed along the determined section of the route over which the vehicle consist is to travel.

11. The system of claim 1, wherein the OM controller is disposed offboard the first vehicle and the local vehicle control system is disposed onboard the first vehicle.

12. The system of claim 11, wherein the OM controller is configured to communicate, directly or indirectly, with other local vehicle control systems that are disposed on other vehicles.

13. A control system for a vehicle consist, comprising:
an operator management (OM) controller comprising:
a first interface electrically coupled to an operator controller of a first vehicle of the vehicle consist, the consist comprising the first vehicle and a second vehicle, the second vehicle logically or mechanically coupled with the first vehicle; and
a second interface electrically coupled to a local vehicle control system of the first vehicle;
wherein the OM controller is logically interposed between the operator controller and the local vehicle control system and is configured to:
receive an operator command via the first interface from the operator controller and receive signals of one or more external conditions relating to operation of the first vehicle from one or more sensors;
evaluate the received operator command to one or more trigger conditions and one or more sensed external conditions;
modify the operator command to generate a modified operator command that is different from the operator command that is received via the first interface responsive to the one or more trigger conditions being met, and
send the modified operator command via the second interface to the local vehicle control system to control operation of the first vehicle based on the modified operator command and via a communication link to the second vehicle to control operation of the second vehicle based on the modified operator command, wherein the modified operator command is based on operating limits of the second vehicle so that both the first vehicle and the second vehicle are controlled to operate within the operating limits of the second vehicle.

* * * * *